(12) United States Patent
Xue et al.

(10) Patent No.: US 10,564,049 B2
(45) Date of Patent: Feb. 18, 2020

(54) COPPER THERMAL RESISTANCE THIN FILM TEMPERATURE SENSOR CHIP, AND PREPARATION METHOD THEREFOR

(71) Applicant: MultiDimension Technology Co., Ltd., Zhangjiagang (CN)

(72) Inventors: Songsheng Xue, Zhangjiagang (CN); Weifeng Shen, Zhangjiagang (CN); Lixian Feng, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 254 days.

(21) Appl. No.: 15/555,965

(22) PCT Filed: Feb. 29, 2016

(86) PCT No.: PCT/CN2016/074799
§ 371 (c)(1),
(2) Date: Sep. 5, 2017

(87) PCT Pub. No.: WO2016/138840
PCT Pub. Date: Sep. 9, 2016

(65) Prior Publication Data
US 2018/0052062 A1    Feb. 22, 2018

(30) Foreign Application Priority Data
Mar. 3, 2015   (CN) .......................... 2015 1 0094489

(51) Int. Cl.
*G01K 7/00* (2006.01)
*G01K 7/18* (2006.01)
*G01K 1/12* (2006.01)

(52) U.S. Cl.
CPC .................. *G01K 7/18* (2013.01); *G01K 1/12* (2013.01); *G01K 7/186* (2013.01)

(58) Field of Classification Search
USPC ............................ 374/183, 163, 185; 338/25
See application file for complete search history.

(56) References Cited

U.S. PATENT DOCUMENTS

| | | | | |
|---|---|---|---|---|
| 6,666,578 | B2 * | 12/2003 | Gibbs | G01K 7/16 374/142 |
| 2015/0226616 | A1 * | 8/2015 | Nagatomo | G01K 13/08 374/185 |

(Continued)

FOREIGN PATENT DOCUMENTS

| CN | 86200693 | 9/1986 |
|---|---|---|
| CN | 104034454 | 9/2014 |

(Continued)

OTHER PUBLICATIONS

"International Application No. PCT/CN2016/074799, International Search Report and Written Opinion dated Jun. 14, 2016'", (dated Jun. 14, 2016), 19 pgs.

*Primary Examiner* — Mirellys Jagan
(74) *Attorney, Agent, or Firm* — Schwegman Lundberg & Woessner, P.A.

(57) ABSTRACT

A copper thermal resistance thin-film temperature sensor chip comprises a substrate, a temperature sensor, and two electrode plates, the temperature sensor which has a plurality of electrically connected resistance elements is placed on the substrate, a portion of the resistance elements form a resistance adjustment circuit. Integrated circuit elements are deposited by thin-film technology. It consists seed layer, copper thermal resistance thin-film layer above the seed layer and passivation layer above the copper thermal resistance thin-film layer. Through semiconductor manufacturing and processing technology, the thermistor layer of this structure is to be fabricated into a serious of thermistor wires and then to form the temperature sensor, furthermore this temperature sensor has a resistance adjustment circuit which (Continued)

is used to adjust resistance value precisely. The preparation method of the sensor chip comprises depositing thin-film on the surface of the substrate, and then a final sensor chip can be obtained through the processing of magnetron sputtering, schematize, peeling, and etching. This sensor chip has the advantages of high impedance, excellent thermal stability, good linearity and low cost.

18 Claims, 2 Drawing Sheets

(56) References Cited

U.S. PATENT DOCUMENTS

| | | | |
|---|---|---|---|
| 2015/0260586 A1* | 9/2015 | Inaba | G01K 7/22 374/185 |
| 2015/0337433 A1* | 11/2015 | Fujita | G01K 7/22 374/185 |
| 2016/0189831 A1* | 6/2016 | Fujita | C04B 35/58007 374/185 |

FOREIGN PATENT DOCUMENTS

| | | |
|---|---|---|
| CN | 203940940 | 11/2014 |
| CN | 104807554 | 7/2015 |
| CN | 204535878 | 8/2015 |
| JP | S5763429 | 4/1982 |
| RU | 2065143 | 8/1996 |
| RU | 2012124608 | 12/2013 |
| WO | WO-2016138840 | 9/2016 |

* cited by examiner

COPPER THERMAL RESISTANCE THIN FILM TEMPERATURE SENSOR CHIP, AND PREPARATION METHOD THEREFOR

PRIORITY CLAIM TO RELATED APPLICATIONS

This application is a U.S. national stage application filed under 35 U.S.C. § 371 from International Application Serial No. PCT/CN2016/074799, which was filed 29 Feb. 2016, and published as WO2016/138840 on 9 Sep. 2016, and which claims priority to Chinese Application No. 201510094489.8, filed 3 Mar. 2015, which applications and publication are incorporated by reference as if reproduced herein and made a part hereof in their entirety, and the benefit of priority of each of which is claimed herein.

TECHNICAL FIELD

The present invention relates to a temperature sensor chip and a preparation method thereof, and in particular, to a temperature sensor chip using a copper thermal resistor as a temperature sensing element and a preparation method thereof.

BACKGROUND ART

A temperature sensor is a sensor that senses temperature and converts the temperature to an available output signal, and mainly includes a thermal resistance temperature sensor, a thermistor temperature sensor, a thermocouple temperature sensor and an integrated P-N junction temperature sensor. As technologies develop, an infrared radiation sensor, a pyroelectric detector, a MOS field-effect transistor infrared detector and an optical fiber temperature sensor have increasingly more applications. The diversified temperature sensors have respective advantages and defects. Several types of most commonly used temperature sensors are thermal resistance temperature sensors, thermistor temperature sensors and thermocouple temperature sensors, and they are applied in slightly different scenarios. A thermistor is generally made of a monocrystalline semiconductor material or a polycrystalline semiconductor material, and is extremely sensitive to temperature. A resistance value thereof will change along with temperature in a stepped manner, and the change is generally non-linear. A thermocouple temperature sensor is very suitable for high-temperature measurement, but has an undesirable measurement effect in a negative temperature interval. Moreover, precautionary measures should be taken for cold-junction compensation, reference-junction temperature control, and lead compensation of the thermocouple temperature sensor, and thus, the measurement process thereof is very complex. A resistance value of a thermal resistance temperature sensor exerts a desirable linear relationship with temperature, and has a good stability. Therefore, the thermal resistance temperature sensor is a most commonly used temperature detector in a medium-low temperature range (−200° C. to 650° C.).

At present, the thermal resistance temperature sensors mostly use platinum as the thermal resistance sensitive material, which have the following major advantages: a resistance value of the metal platinum changes as the temperature changes, forming a basically linear relationship, and the change has desirable reproducibility and stability. Therefore, such thermal resistance temperature sensor has high measurement precision and a broad application temperature range, and is a most commonly used temperature detector in a medium-low temperature range (−200° C. to 650° C.). Another commonly used thermal resistance material is nickel, which has a temperature coefficient of resistance being 1.7 times that of platinum, and has a higher sensitivity. Therefore, the expensive platinum thermal resistor may be replaced with a nickel thermal resistor in a case having a relatively low precision requirement. Compared with platinum and nickel, copper has the best linearity, and has a temperature coefficient of resistance higher than that of platinum. However, copper has obvious defects: the low resistivity causes low sensitivity and low precision, and copper is easily oxidized, corroded and the like. The above defects severely limit applications of copper in temperature detection, and people have not paid much attention to copper over a long period of time.

SUMMARY OF THE INVENTION

To overcome the above defects in the prior art, a copper thermal resistance thin-film temperature sensor chip of the present invention adopts an improved thin film process, reduces the amounts of impurities and defects in a deposited metal film, and greatly improves the resistivity of a copper thin film. In the process of manufacturing the sensor, a passivation protection layer is added such that the copper thin film is prevented from being oxidized and corroded, thus improving the durability, retaining the good linearity, and having advantages of high impedance, excellent thermal stability, and low cost. By means of high-temperature vacuum heat treatment, micro-defects in the copper thin film are further reduced, and the temperature coefficient of resistance of a temperature-sensitive thin film may be further controlled and adjusted.

To achieve the above objectives, the present invention provides a copper thermal resistance thin-film temperature sensor chip, including a substrate, a temperature sensor and two electrode plates. The temperature sensor which has a detection resistor and a resistance adjustment circuit is placed on the substrate. The detection resistor and the resistance adjustment circuit each consist of a plurality of electrically connected resistance elements. All the resistance elements are covered with an insulating passivation layer, and the two electrode plates are connected to resistance elements at two ends of the resistance adjustment circuit respectively.

All the resistance elements are formed by schematizing a temperature-sensitive thin film. The temperature-sensitive thin film includes a copper thermal resistance thin-film layer and a passivation protection layer covering the surface of the copper thermal resistance thin-film layer. The copper thermal resistance thin-film layer is made of a thermal sensitive material, and has a nanocrystalline structure with a length of crystallites or defects thereof not greater than 500 nm.

Further, the temperature-sensitive thin film further comprises a seed layer located between the substrate and the copper thermal resistance thin-film layer. The nanostructure of the copper thin film is used for controlling the temperature coefficient of resistance of the temperature-sensitive thin film, and can be further optimized by selecting the material of the seed layer and by an annealing process during manufacturing.

Further, the whole chip except for a connection electrode is covered with an elastic protection layer.

Preferably, the passivation protection layer is a high-temperature protection coating used for improving the high-temperature tolerance of the temperature sensor.

Preferably, the passivation protection layer is made of various oxides and nitrides, and is not limited to a specific material.

Preferably, the oxide of the passivation protection layer includes aluminum oxide, magnesium oxide, silicon oxide and tantalum oxide.

Preferably, the nitride of the passivation protection layer includes titanium nitride, aluminum nitride, tantalum nitride and silicon nitride.

Preferably, the copper thermal resistance thin-film layer is a copper thin film or a copper alloy thin film, and the copper alloy thin film is CuCr, CuNi, CuSn, CuNiFe or CuNiTi.

Further, the thickness of the copper thermal resistance thin-film layer is 200-50000 Å.

Preferably, the detection resistor is serpentine or spiral, and the electrode plate is square, rectangular or circular.

The present invention further provides a preparation method of a copper thermal resistance thin-film temperature sensor chip, including the following steps:

S1. cleaning the surface of a substrate, and depositing a temperature-sensitive thin film on the substrate;

S2. performing vacuum heat treatment on the deposited temperature-sensitive thin film, the vacuum heat treatment aiming to eliminate micro-defects in the film and adjust the temperature coefficient of resistance (TCR) of a thermal sensitive layer;

S3. schematizing the vacuum-heat-treated temperature-sensitive thin film to form resistance elements in the temperature sensor;

S4. depositing an insulating passivation layer above the resistance elements, and windowing the insulating passivation layer to expose a thermal sensitive material for constructing a connection electrode;

S5. growing an electrode at the window of the insulating passivation layer, the electrode being available for subsequent ball bonding or direct surface-mount package;

S6. adjusting a resistance value of the temperature sensor chip to its specified value by a laser; and S7. depositing an elastic protection layer on the whole chip except for the connection electrode.

Preferably, the depositing a temperature-sensitive thin film on the substrate in step S1 includes:

S101. depositing a seed layer on the substrate;

S102. sputtering a copper thermal resistance thin-film layer on the seed layer to serve as the thermal sensitive material; and S103. sputtering a passivation protection layer on the copper thermal resistance thin-film layer.

Preferably, the depositing a temperature-sensitive thin film on the substrate in step S1 includes:

S111. sputtering a copper thermal resistance thin-film layer on the substrate to serve as the thermal sensitive material; and S112. sputtering a passivation protection layer on the copper thermal resistance thin-film layer.

In the above method, the material of the substrate is silicon, aluminum oxide, sapphire, aluminum nitride, silicon carbide, silicon nitride or glass ceramics. It should be decided whether to add the seed layer according to the adhesion between the thermal sensitive material thin film and the substrate, a requirement of a product on the temperature coefficient of resistance and the like. The seed layer includes a metal oxide such as aluminum oxide, magnesium oxide and titanium oxide, or a metal nitride such as aluminum nitride and titanium nitride. The passivation protection layer includes a metal nitride such as titanium nitride, aluminum nitride, tantalum nitride and silicon nitride, and a metal oxide such as aluminum oxide, magnesium oxide, silicon oxide and tantalum oxide.

Preferably, the temperature of vacuum heat treatment in step S3 is 150-600° C.

Preferably, the copper thermal resistance thin-film layer is a copper thin film or a copper alloy thin film, and the copper alloy thin film is CuCr, CuNi, CuSn, CuNiFe or CuNiTi.

Preferably, the thickness of the copper thermal resistance thin-film layer is 200-50000 Å.

Further, in the step S3, a detection resistor and a resistance adjustment circuit of the temperature sensor are formed by electrically connecting a plurality of the resistance elements, and in the step S6, a resistance value of the temperature sensor chip is adjusted to its specified value by adjusting a resistance value of the resistance adjustment circuit.

Compared with the prior art, the present invention has the following technical effects:

(1) the film is formed through a one-step process, and the preparation process is simple;

(2) the copper thermal resistance thin-film temperature sensor has higher linearity compared with platinum and nickel thermal resistance temperature sensors of the same kind;

(3) the used metal sensitive material is ultra-thin, such that the temperature sensor chip not only has the characteristic of high impedance, but also has a desirable temperature characteristic; and (4) the copper material is widely available, so that the cost is greatly reduced compared with other types of metal thermal resistance temperature sensors.

BRIEF DESCRIPTION OF THE DRAWINGS

In order to explain technical solutions of technologies in embodiments of the present invention more clearly, a brief introduction of drawings to be used for describing the technologies in embodiments will be made below. Apparently, the drawings described below are merely some embodiments of the present invention, and other drawings can also be obtained according to these drawings by those skilled in the art without creative efforts.

DETAILED DESCRIPTION

The present invention will be described in detail with reference to the accompanying drawings and in combination with the embodiments.

Embodiment

Figure 1:
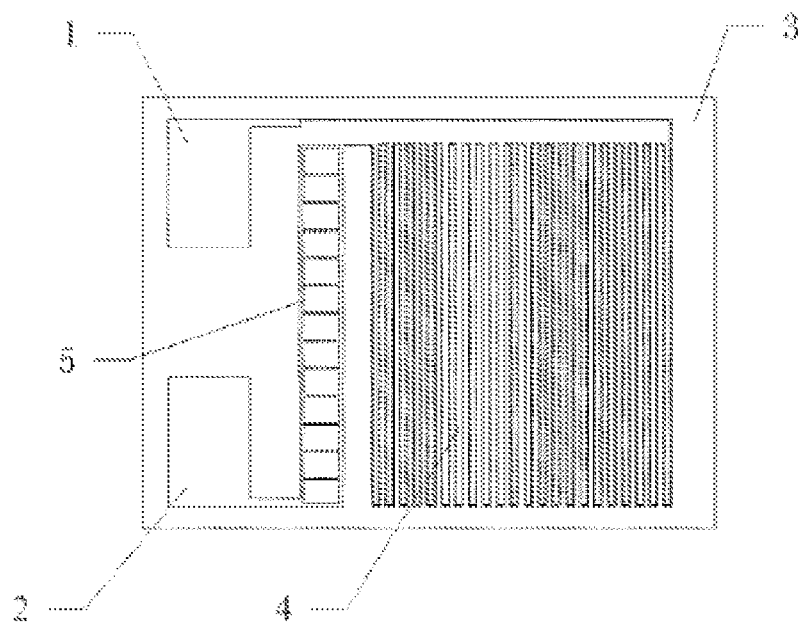
FIG. 1 is a schematic structural diagram of a copper thermal resistance thin-film temperature sensor chip according to the present invention.

FIG. 1 is a schematic structural diagram of a copper thermal resistance thin-film temperature sensor chip according to the present invention. The sensor chip includes a substrate 3 and a temperature sensor integrated in the chip 3. The temperature sensor has a detection resistor 4 and a resistance adjustment circuit 5 each formed by connecting a plurality of resistance elements. All the resistance elements are covered with an insulating passivation layer 9. Electrode plates 1 and 2 are connected to resistance elements at two ends of the resistance adjustment circuit 5 respectively. An elastic protection layer 11 is further deposited on the whole chip except for a connection electrode.

All the resistance elements are formed by schematizing a temperature-sensitive thin film. The temperature-sensitive thin film includes a seed layer 6, a copper thermal resistance thin-film layer 7 above the seed layer, and a passivation protection layer 8 above the copper thermal resistance thin-film layer. The copper thermal resistance thin-film layer 7 is made of a thermal sensitive material, and has a nanocrystalline structure with a length of crystallites or defects thereof not greater than 500 nm.

The copper thermal resistance thin-film layer 7 is a copper thin film or a copper alloy thin film, and the copper alloy thin film is CuCr, CuNi, CuSn, CuNiFe or CuNiTi. The copper alloy thin film has advantages such as improved corrosion resistance, reduced gaps caused by a pressure, and reduced roughness of the thin film.

Figure 3:
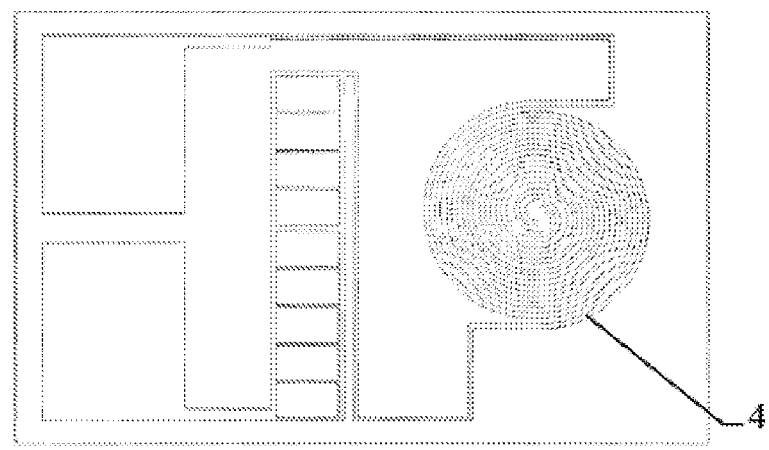
FIG. 3 is a schematic diagram of a spiral resistance element according to the present invention.
Figure 4:
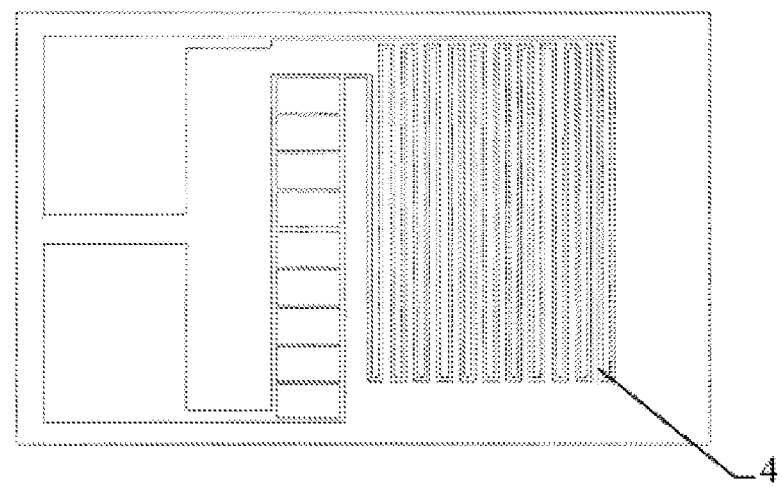
FIG. 4 is a schematic diagram of a serpentine resistance element according to the present invention.

Referring to FIG. 3 and FIG. 4, the detection resistor 4 may be serpentine or spiral, and the electrode plates 1 and 2 are square, rectangular or circular. The present invention is not limited to the above shapes. The substrate may be made of a material such as silicon, aluminum oxide, sapphire, aluminum nitride, silicon carbide, silicon nitride or glass ceramics. In this embodiment, the substrate is a silicon substrate.

Figure 5:
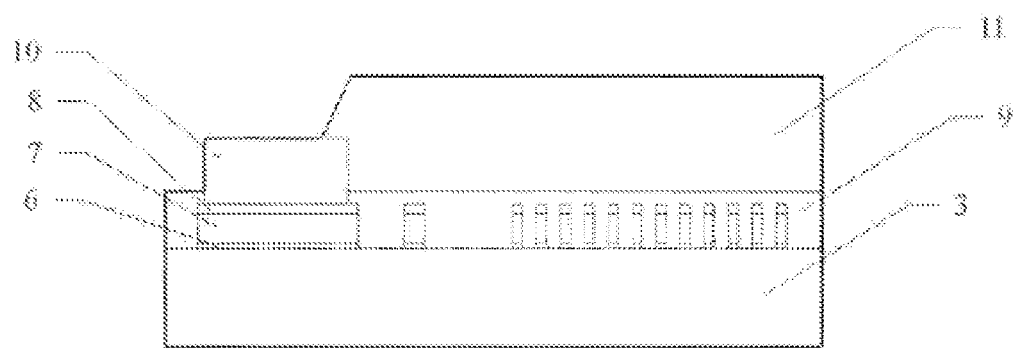
FIG. 5 is a sectional diagram of a copper thermal resistance thin-film temperature sensor chip according to the present invention.

A preparation method of a copper thermal resistance thin-film temperature sensor chip shown in FIG. 5 includes the following steps:

(1) The surface of a substrate 3 is cleaned first, and a seed layer 6 is deposited on the substrate 3. The thickness of the seed layer is adjusted mainly according to a requirement of a product on the temperature coefficient of resistance, or may not be adjusted, depending on an actual product requirement. The seed layer 6 may be a metal oxide such as aluminum oxide, magnesium oxide or titanium oxide, or a metal nitride such as aluminum nitride or titanium nitride. In this embodiment, the seed layer is made of magnesium oxide (MgO).

(2) A copper thermal resistance thin-film layer 7 having a thickness of 200-10000 Å is sputtered on the seed layer 6 by using a magnetron sputtering method to serve as a thermal sensitive material, and a passivation protection layer 8 is then deposited. The copper thermal resistance thin-film layer 7 is a copper thin film or a copper alloy thin film, and the copper alloy thin film is CuCr, CuNi, CuSn, CuNiFe or CuNiTi. The passivation protection layer 8 is made of various metal nitride (such as titanium nitride, tantalum nitride, aluminum nitride and silicon nitride) and metal oxide (such as aluminum oxide, magnesium oxide and silicon oxide) materials. In this embodiment, the passivation protection layer is made of tantalum nitride (TaN).

(3) Heat treatment is performed on the above deposited temperature-sensitive thin film (the temperature-sensitive thin film includes the seed layer 6, the copper thermal resistance thin-film layer 7 and the passivation protection layer 8). The heat treatment is performed in a vacuum environment, and the heat treatment can improve the quality of the thin film and improve the temperature coefficient of resistance. The temperature of the heat treatment is generally 150-600° C. The actual temperature depends on the requirement of the product. In this embodiment, the temperature is 350° C.

(4) The heat-treated temperature-sensitive thin film is schematized to form resistance elements for temperature measurement. The forming the resistance elements by schematizing herein is equivalent to defining functional devices by using photolithography and particle beam etching processes.

(5) An insulating passivation layer 9 is deposited above the resistance elements formed after schematizing. The insulating passivation layer 9 may be made of a material such as aluminum oxide, silicon dioxide and silicon nitride. In this embodiment, the material of the insulating passivation layer is silicon dioxide. The insulating passivation layer is windowed to expose a thermal sensitive material for constructing a connection electrode.

An electrode 10 is grown at the window of the insulating passivation layer. The material of the electrode may be gold, copper, platinum, nickel, silver, tin and an alloy thereof. In this embodiment, the material of the electrode is gold, and the electrode is used for subsequent ball bonding or direct surface-mount package.

(6) Resistance values of the resistance elements in the temperature sensor are adjusted to their specified values by using a laser resistance adjustment method.

(7) An elastic protection layer 11 is deposited on the whole chip except for the connection electrode, and so for, the whole process is completed.

Working principles of the temperature sensor are introduced in the following.

The temperature sensor shown in FIG. 1 generally measures temperature by using a theoretical principle of a resistance temperature sensor, that is, the resistivity of metal is proportional to temperature in the vicinity of the Debye temperature. For a copper thermal resistor, in the vicinity of the normal temperature, $R_T=R_0[1+AT+BT^2]$, wherein $R_0$ and $R_T$ are resistance values of the copper resistor at 0° C. and T° C. respectively, and A and B are constants; therefore, a value of the temperature may be obtained by measuring $R_T$.

Figure 2:
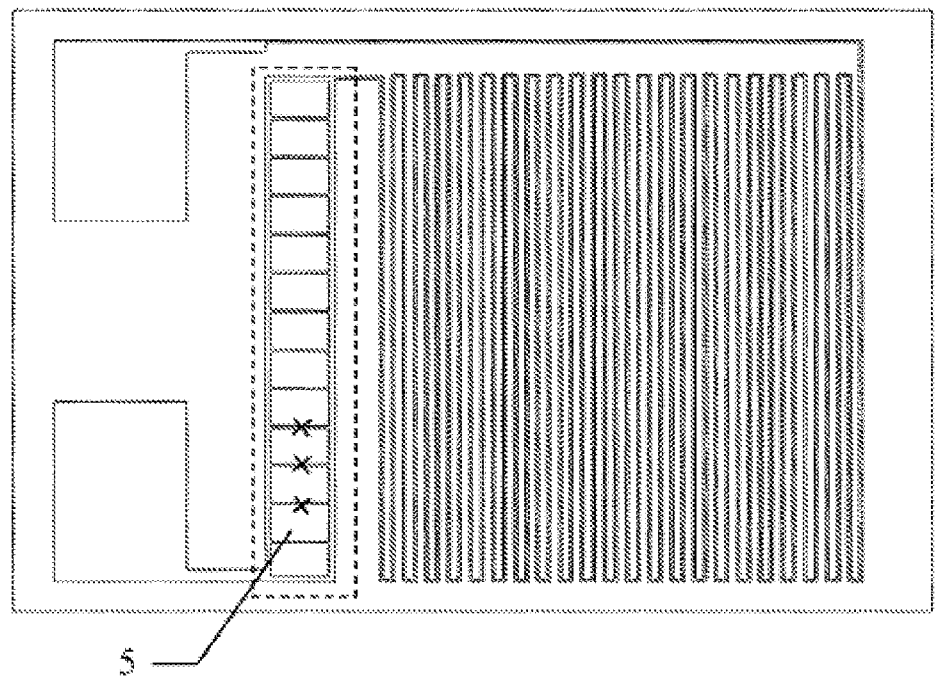
FIG. 2 is a diagram of a resistance adjustment circuit according to the present invention.

FIG. 2 shows a schematic diagram of a resistance adjustment circuit according to the present invention. A resistance adjustment circuit 5 is shown in the dashed box. A designed resistance of the chip will be lower than an actually required resistance value, and a difference therebetween is adjusted by using laser resistance adjustment. The specific method is that: some resistance wires in the resistance adjustment circuit 5, e.g., positions marked with crosses in FIG. 2, are cut off or fused intentionally to adjust the resistance value of the chip to a specified value. During actual design and operation, the resistance wires of the resistance adjustment circuit may have different designed dimensions (length and width) respectively corresponding to different resistance values, to achieve the objective of precise resistance adjustment.

The above descriptions are merely preferred embodiments of the present invention, and are not intended to limit the present invention. For those skilled in the art, the present invention may have various modifications and variations. Any modification, equivalent replacement, improvement or the like made within the spirit and principle of the present invention should fall within the scope of the present invention.

The invention claimed is:

1. A copper thermal resistance thin-film temperature sensor chip, comprising:
   a substrate,
   a temperature sensor, and
   two electrode plates, wherein the temperature sensor which has a detection resistor and a resistance adjustment circuit is placed on the substrate, wherein the detection resistor and the resistance adjustment circuit each consist of a plurality of electrically connected resistance elements, wherein all of the resistance elements are covered with an insulating passivation layer, and the two electrode plates are connected to resistance elements at two ends of the resistance adjustment circuit respectively.

2. The copper thermal resistance thin-film temperature sensor chip of claim 1,
wherein the detection resistor is serpentine or spiral, and the electrode plates are square, rectangular or circular.

3. The copper thermal resistance thin-film temperature sensor chip of claim 1,
wherein the copper thermal resistance thin-film temperature sensor chip includes a connection electrode, and the whole temperature sensor chip except for the connection electrode is covered with an elastic protection layer.

4. The copper thermal resistance thin-film temperature sensor chip of claim 1,
wherein the temperature-sensitive thin film includes a passivation protection layer,
wherein the passivation protection layer is a high-temperature protection coating used for improving the high-temperature tolerance of the temperature sensor, and
wherein the passivation protection layer is a metal oxide or a metal nitride, the metal oxide comprises aluminum oxide, magnesium oxide, silicon oxide and tantalum oxide, and the metal nitride comprises titanium nitride, aluminum nitride, tantalum nitride and silicon nitride.

5. The copper thermal resistance thin-film temperature sensor chip of claim 1,
wherein all the resistance elements are formed by schematizing a temperature-sensitive thin film, and the temperature-sensitive thin film comprises a copper thermal resistance thin-film layer and a passivation protection layer covering the surface of the copper thermal resistance thin-film layer,
wherein the copper thermal resistance thin-film layer is made of a thermal sensitive material, and has a nanocrystalline structure with a typical length of crystallites or defects thereof not greater than 500 nm.

6. The copper thermal resistance thin-film temperature sensor chip of claim 5,
wherein the temperature-sensitive thin film further comprises a seed layer located between the substrate and the copper thermal resistance thin-film layer.

7. The copper thermal resistance thin-film temperature sensor chip of claim 5,
wherein the copper thermal resistance thin-film layer is a copper thin film or a copper alloy thin film, and the copper alloy thin film is CuCr, CuNi, CuSn, CuNiFe or CuNiTi.

8. The copper thermal resistance thin-film temperature sensor chip of claim 5,
wherein the thickness of the copper thermal resistance thin-film layer is 200-50000 Å.

9. A preparation method of the copper thermal resistance thin-film temperature sensor chip of claim 1, wherein the copper thermal resistance thin-film temperature sensor chip has a resistance of a specified resistance value, the method comprising:

S1) cleaning the surface of a substrate, and depositing a temperature-sensitive thin film on the substrate;
S2) performing vacuum heat treatment on the deposited temperature-sensitive thin film;
S3) schematizing the vacuum-heat-treated temperature-sensitive thin film to form resistance elements in the temperature sensor;
S4) depositing an insulating passivation layer above the resistance elements, and windowing the insulating passivation layer to expose a thermal sensitive material for constructing a connection electrode;
S5) growing an electrode at the window of the insulating passivation layer;
S6) adjusting a resistance value of the temperature sensor chip to the specified resistance value; and
S7) depositing an elastic protection layer on the whole chip except for the connection electrode.

10. The preparation method of the copper thermal resistance thin-film temperature sensor chip of claim 9, wherein the depositing a temperature-sensitive thin film on the substrate in step S1 comprises:
S111) sputtering a copper thermal resistance thin-film layer on the substrate to serve as the thermal sensitive material; and
S112) sputtering a passivation protection layer on the copper thermal resistance thin-film layer.

11. The preparation method of the copper thermal resistance thin-film temperature sensor chip of claim 9,
wherein the material of the substrate is silicon, aluminum oxide, sapphire, aluminum nitride, silicon carbide, silicon nitride or glass ceramics.

12. The preparation method of the copper thermal resistance thin-film temperature sensor chip of claim 9,
wherein the temperature of a vacuum heat treatment in step S3 is 150-600° C.

13. The preparation method of the copper thermal resistance thin-film temperature sensor chip of claim 9,
wherein in step S3, a detection resistor and a resistance adjustment circuit of the temperature sensor are formed by electrically connecting a plurality of the resistance elements, and
wherein in step S6, a resistance value of the temperature sensor chip is adjusted to its specified value by adjusting a resistance value of the resistance adjustment circuit.

14. The preparation method of the copper thermal resistance thin-film temperature sensor chip of claim 9, wherein the depositing a temperature-sensitive thin film on the substrate in step S1 comprises:
S101) depositing a seed layer on the substrate;
S102) sputtering a copper thermal resistance thin-film layer on the seed layer to serve as the thermal sensitive material; and
S103) sputtering a passivation protection layer on the copper thermal resistance thin-film layer.

15. The preparation method of the copper thermal resistance thin-film temperature sensor chip of claim 14,
wherein the seed layer is a metal oxide or a metal nitride, the metal oxide comprises aluminum oxide, magnesium oxide and titanium oxide, and the metal nitride comprises aluminum nitride and titanium nitride.

16. The preparation method of the copper thermal resistance thin-film temperature sensor chip of claim 14,
wherein the temperature-sensitive thin film includes a passivation protection layer, and
wherein the passivation protection layer is a metal oxide or a metal nitride, the metal nitride comprises titanium nitride, aluminum nitride, tantalum nitride and silicon nitride, and the metal oxide comprises aluminum oxide, magnesium oxide, silicon oxide and tantalum oxide.

17. The preparation method of the copper thermal resistance thin-film temperature sensor chip of claim 14,
wherein the copper thermal resistance thin-film layer is a copper thin film or a copper alloy thin film, and the copper alloy thin film is CuCr, CuNi, CuSn, CuNiFe or CuNiTi.

18. The preparation method of the copper thermal resistance thin-film temperature sensor chip of claim 17,
wherein the thickness of the copper thermal resistance thin-film layer is 200-50000 Å.

* * * * *